Figure 1:
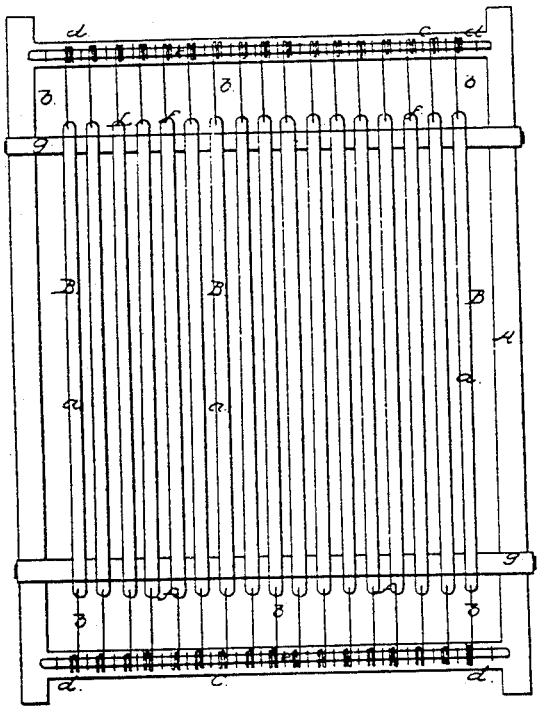
Figure 2:
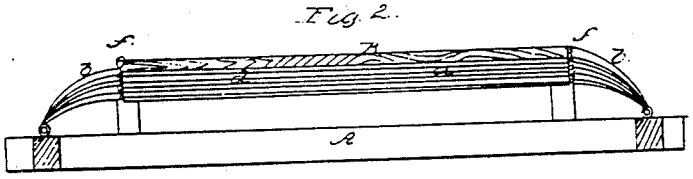
Figure 3:
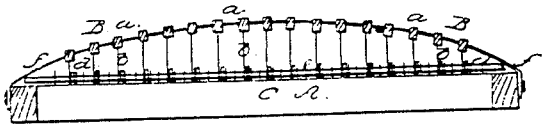

BEST AVAILABLE COPY

H. Tucker,

Bed Bottom,

No. 160, A.I. June 9, 1857.

R. PETERS, PHOTO-LITHOGRAPHER, WASHINGTON, D.C.